H. H. MAY, Dec'd.,

R. MAY, Administrator.

Corset.

No. 8,576. Reissued Feb. 11, 1879.

*Witnesses:*

Otto Colley

W. H. Blackler

*Inventor*

Robert May.

ad. by

J. B. Staples.

atty.

N. PETERS, PHOTO-LITHOGRAPHER, WASHINGTON, D. C.

H. H. MAY, Dec'd.,
R. MAY, Administrator.
Corset.

No. 8,576. Reissued Feb. 11, 1879.

Witnesses:
Otto Colley
Geo. H. Blackler

Inventor
Robert May, Ad.r
by J. B. Stoyles
atty.

N. PETERS, PHOTO-LITHOGRAPHER, WASHINGTON, D. C.

UNITED STATES PATENT OFFICE.

ROBERT MAY, OF BIRMINGHAM, CONNECTICUT, ADMINISTRATOR OF HARRIET H. MAY, DECEASED.

IMPROVEMENT IN CORSETS.

Specification forming part of Letters Patent No. 178,789, dated June 13, 1876; Reissue No. 8,576, dated February 11, 1879; application filed August 5, 1878.

*To all whom it may concern:*

Be it known that HARRIET H. MAY, deceased, late of Birmingham, in the county of New Haven, State of Connecticut, did invent new and useful Improvements in Corsets, of which the following is a specification:

This invention relates to a novel construction of the front part of the corset, the said front part of the corset being constructed of patterns or pieces of new and peculiar forms, which, when put together, compose the front of the cloth of the corset; also to certain straps having adjusting buckles or attachments, connecting the breast portions of the corset and keeping them in position.

Figure 1:
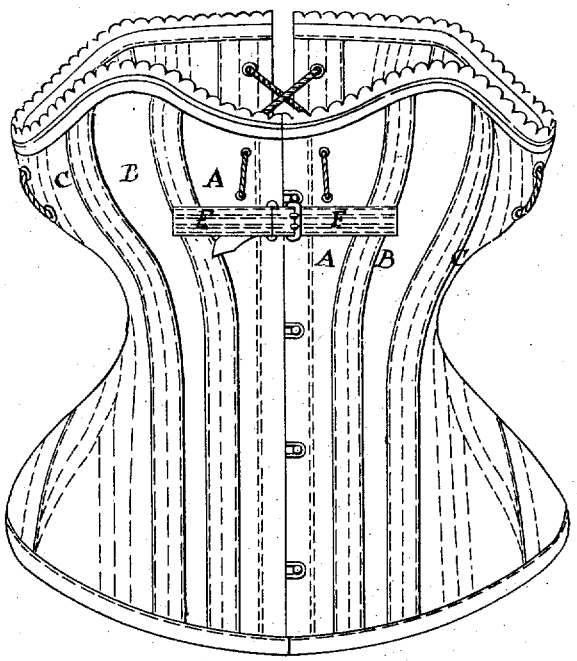
Figure 2:
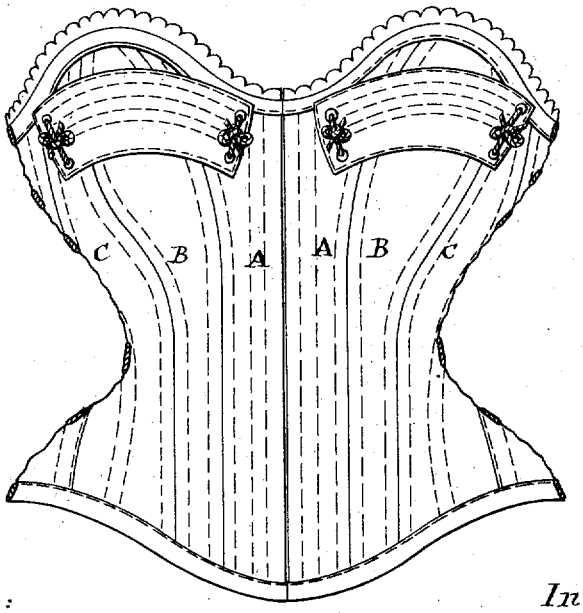
Figure 3:
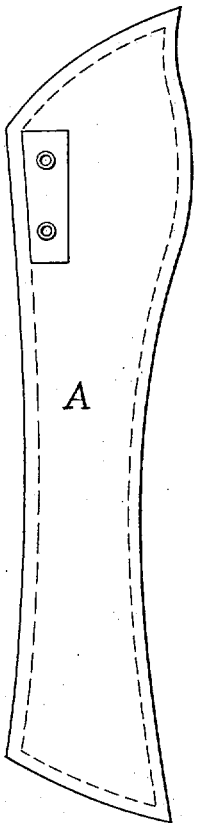
Figure 4:
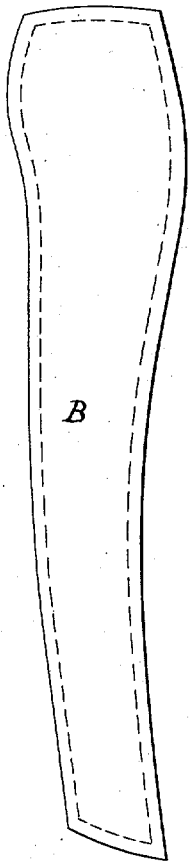
Figure 5:
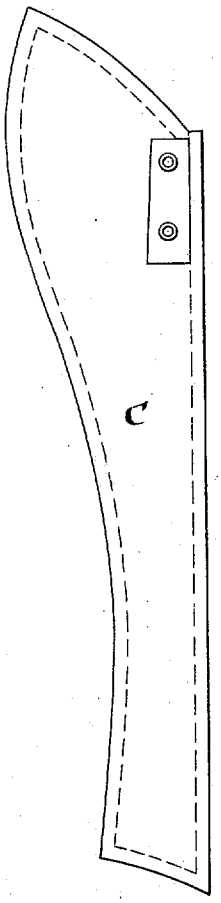

In the accompanying drawings, Figure 1 is an exterior view of the front of the corset and of a portion of the back. Fig. 2 is an interior view of the front part of the corset. Figs. 3, 4, and 5 represent the pieces or patterns of the cloth of which the front of the corset is composed separately in detail.

Figs. 1 and 2 also show the adjusting-straps and buckle, and the pads in connection therewith, in place upon the corset.

In each of the figures similar letters represent similar parts.

The first part of the invention has for its object the making the front part of the corset in parts or pieces of the cloth in such forms and patterns as that when arranged together in the proper positions and sewed at their edges, together, they will constitute the desired form and contour of the front of the corset. These pieces and patterns are exhibited in three parts in the diagrams, Figs. 3, 4, and 5, and they are shown in the drawings, Fig. 1, in the position in which they are sewed to form the front of the corset.

A represents the outside piece and pattern, which is at the opening of the corset where the corset steels and clasps for closing and opening the front of the corset are attached. B is the next adjoining and middle piece and pattern. C is the next. These pieces extend from the bottom to the top of the corset. The cloth is cut to the form and pattern of the parts A B C, as shown in the diagrams, and the pieces are sewed together, edge to edge, their entire length, in the position described, and form the shape and contour required, as well of the body of the corset-front as the part covering the bosom, and they reach to the upper line of the breasts and cover and inclose them, with the proper swells and curves, without the use of any gores. These pieces A B C are arranged on either side of the opening of the corset, as shown in Figs. 1, 2, and correspond precisely to each other.

In the manufacture of the corsets, the cloth, cut in the forms described, is double, vertical lines of stitching unite the two thicknesses, and lines of stitching also form sheaths suitable for the insertion of the stays or springs of the corset. This mode of making the corset-fronts, of the forms and patterns described, affords simplicity, facility, and economy in the cutting out and constructing the corset-front, and effectually adapts it to the natural form of the body and bust, and avoids altogether the use of gores or slits.

Although in the preceding description the corset-front has been described as composed of patterns in three pieces, it is not intended thereby to make three parts an absolutely essential ingredient of the invention; the number may be varied. But so long as the number of parts, when put together, embody the shape and pattern of the three parts above described, and extend the whole length of the corset without gores or slits, it is claimed that such construction will be covered by the invention.

The second part of the invention relates to the straps, which are shown in the drawings, Fig. 1, at E F. These straps are attached one to each of the breast portions of the corset, and they are connected together by a buckle or any suitable fastening, so that they may be drawn together or extended, and thereby regulate or adjust the bosom-pads or bust portions with reference to their relative position to each other.

That which constitutes the invention in the foregoing-described improvements, and which it is desired to secure by Letters Patent, is—

1. A corset the front sections whereof, on either side the opening, are constituted of the three pieces of cloth A B C, cut after the patterns described, and arranged and sewed together edge to edge, substantially in the manner set forth.

2. The three pieces A B C, cut to the patterns described, when arranged and combined in a corset as set forth, to form the front of the corset and the bosom-swells, the recesses, and shape of front complete, required for the bust and body, as set forth.

3. The straps E F, attached to the upper portion and on each side of the corset, and connected by a buckle, G, or other adjustable fastening, as and for the purpose set forth.

ROBERT MAY,
*Administrator.*

Witnesses:
ROBBIE S. GARDNER,
S. M. GARDNER.